(12) United States Patent
Bolich et al.

(10) Patent No.: US 8,746,393 B2
(45) Date of Patent: Jun. 10, 2014

(54) LAYOUT OF COMPACT ALL TERRAIN VEHICLE FOR FUEL TANK AND REAR GEAR UNIT POSITIONING

(75) Inventors: Harold Bolich, Newnan, GA (US); Christopher Gervais, Newnan, GA (US); William McClendon, Newnan, GA (US)

(73) Assignees: Yamaha Hatsudoki Kabushiki Kaisha, Shizuoka (JP); Yamaha Motor Manufacturing Corporation of America, Newnan, GA (US)

( * ) Notice: Subject to any disclaimer, the term of this patent is extended or adjusted under 35 U.S.C. 154(b) by 953 days.

(21) Appl. No.: 12/616,288

(22) Filed: Nov. 11, 2009

(65) Prior Publication Data

US 2011/0108344 A1 May 12, 2011

(51) Int. Cl.
*B60K 17/02* (2006.01)

(52) U.S. Cl.
CPC .............. *B60K 17/02* (2013.01); *Y10S 180/908* (2013.01)
USPC .......... 180/244; 180/69.4; 180/383; 180/908; 180/233; 192/218

(58) Field of Classification Search
CPC ............. B60T 1/12; B60T 1/00; B60T 1/005; B60K 17/02; B60K 17/22; B60K 17/34; B60K 15/00; B60K 15/03006; B60K 15/03; B60K 15/063; B60K 15/067; B60K 15/07; F16D 55/00; F16D 55/24
USPC ......... 180/291, 292, 297, 311, 312, 383, 244, 180/908, 370, 69.4; 280/781, 795, 796, 280/798; 192/215, 218, 221, 221.1

See application file for complete search history.

(56) References Cited

U.S. PATENT DOCUMENTS

| 4,671,377 | A  | * | 6/1987  | Ehrlinger et al. ............. 180/249 |
| 7,114,598 | B2 | * | 10/2006 | Takagi ......................... 188/71.6 |
| 7,347,296 | B2 | * | 3/2008  | Nakamura et al. ........... 180/68.1 |
| 7,665,770 | B2 | * | 2/2010  | Yamamura .................... 280/835 |
| 7,730,986 | B2 | * | 6/2010  | Takeshima et al. .......... 180/68.5 |
| 8,061,467 | B2 | * | 11/2011 | Takeshima et al. .......... 180/291 |
| 2002/0112907 | A1 | * | 8/2002  | Maeda et al. ................ 180/69.4 |
| 2004/0256853 | A1 | * | 12/2004 | Mercier et al. ............... 280/834 |
| 2007/0026983 | A1 | * | 2/2007  | Shimizu et al. ................ 474/43 |
| 2007/0181358 | A1 | * | 8/2007  | Nakagaki et al. ............ 180/233 |
| 2008/0017434 | A1 | * | 1/2008  | Harper et al. ................ 180/370 |
| 2008/0099263 | A1 | * | 5/2008  | Takeshima et al. .......... 180/68.3 |
| 2011/0042160 | A1 | * | 2/2011  | Schapf .......................... 180/384 |

* cited by examiner

*Primary Examiner* — J. Allen Shriver, II
*Assistant Examiner* — Steve Clemmons
(74) *Attorney, Agent, or Firm* — Keating & Bennett, LLP

(57) ABSTRACT

An engine unit 5 is arranged in the middle of the vehicle body frame 2 with respect to the widthwise direction of the vehicle and rearward of the steering shaft 28, and the fuel tank 10 with a built-in fuel pump 11 and the rear gear unit 31 comprising a wet brake 45 are arranged rearward of the cylinder head 20*b* of the engine unit 5 and such that at least a portion of the fuel tank 10 and of the rear gear unit 31 is located in the middle with respect to the widthwise direction of the vehicle, and the power steering unit 47 comprising an electric motor 49 is arranged forward of the cylinder head 20*b* and such that at least a portion of the unit is located in the middle with respect to the widthwise direction of the vehicle.

10 Claims, 12 Drawing Sheets

LAYOUT OF COMPACT ALL TERRAIN VEHICLE FOR FUEL TANK AND REAR GEAR UNIT POSITIONING

TECHNICAL FIELD

The present invention relates to a compact all terrain vehicle, and more specifically, to an improvement of the layout of the engine unit, electric power steering unit, fuel tank and rear gear unit.

BACKGROUND ART

A compact vehicle is disclosed for instance in US2006219452. In this compact vehicle, an engine unit comprising a V-belt type automatic transmission is mounted below the seat, and an electric power steering system is installed.

Furthermore, compact vehicles include vehicles equipped with an electronic fuel injection system.

There is a demand in the market for vehicles that have a compact body while having more complete accessories of various types. However, when an electric power steering unit is provided, a relatively large electric motor and gear mechanism become necessary, and when an electronic fuel injection system is provided, a relatively large fuel pump to supply high pressure fuel to the fuel injection valve becomes necessary, so the problem of the width dimension and height dimension of the vehicle body becoming larger depending on how these components are laid out becomes a concern.

SUMMARY OF THE INVENTION

The present invention provides an all terrain vehicle which makes it possible to make the body compact even when an electric power steering unit, a fuel tank with a built-in fuel pump and the like are installed.

The present invention is an all terrain vehicle that includes: a vehicle body frame; a pair of left and right front wheels supported on the front part of the vehicle body frame and a pair of left and right rear wheels supported on the rear part of the vehicle body frame; a steering shaft which steers said front wheels and is provided on the middle part of the vehicle body frame with respect to the widthwise direction of the vehicle; an engine unit supported on the vehicle body frame, arranged to the rear of said steering shaft with respect to the front-back direction of the vehicle, and including a crankcase, a cylinder body and cylinder head extending from the crankcase, and a transmission case which is provided to the side of the crankcase with respect to the widthwise direction of the vehicle and houses a V-belt type non-stage transmission; a seat supported on the vehicle body frame so as to be located above the engine unit; footrests supported on the vehicle body frame so as to be located to the sides of the engine unit with respect to the widthwise direction of the vehicle; a fuel tank which includes a fuel pump whereof at least a portion is housed inside of the fuel tank, and is supported on the vehicle body frame so as to be located rearward of said cylinder head with respect to the front-back direction of the vehicle and with at least a portion of the fuel tank being located in the middle with respect to the widthwise direction of the vehicle; an electric power steering unit which is provided on the steering shaft forward of the cylinder head with respect to the front-back direction of the vehicle and with at least a portion of the unit being located in the middle with respect to the widthwise direction of the vehicle, and includes an electric motor which provides steering power assist; and a rear gear unit which includes a wet brake and is supported on the vehicle body frame so as to be located rearward of the engine unit with respect to the front-back direction of the vehicle and with at least a portion of the unit being located in the middle with respect to the widthwise direction of the vehicle.

In one embodiment, the engine unit is arranged in the middle with respect to the widthwise direction of the vehicle body frame and rearward of the steering shaft, a fuel tank with a built-in fuel pump, and a rear gear unit with a wet brake is arranged to the rear of the cylinder head of the engine unit such that at least a portion of it is located in the middle with respect to the widthwise direction of the vehicle, and a power steering unit comprising an electric motor is arranged forward of the cylinder head such that at least a portion of it is located in the middle with respect to the widthwise direction of the vehicle. In this way, by employing a combination of fuel tank with a built-in fuel pump, rear gear unit including a wet brake and power steering unit including an electric motor, lined up in the front-back direction of the vehicle and such that at least a portion of them is located in the middle with respect to the widthwise direction of the vehicle, it becomes possible to avoid an increase in the widthwise dimension of the vehicle body, allowing the body to be made more compact.

DETAILED DESCRIPTION

Figure 1:
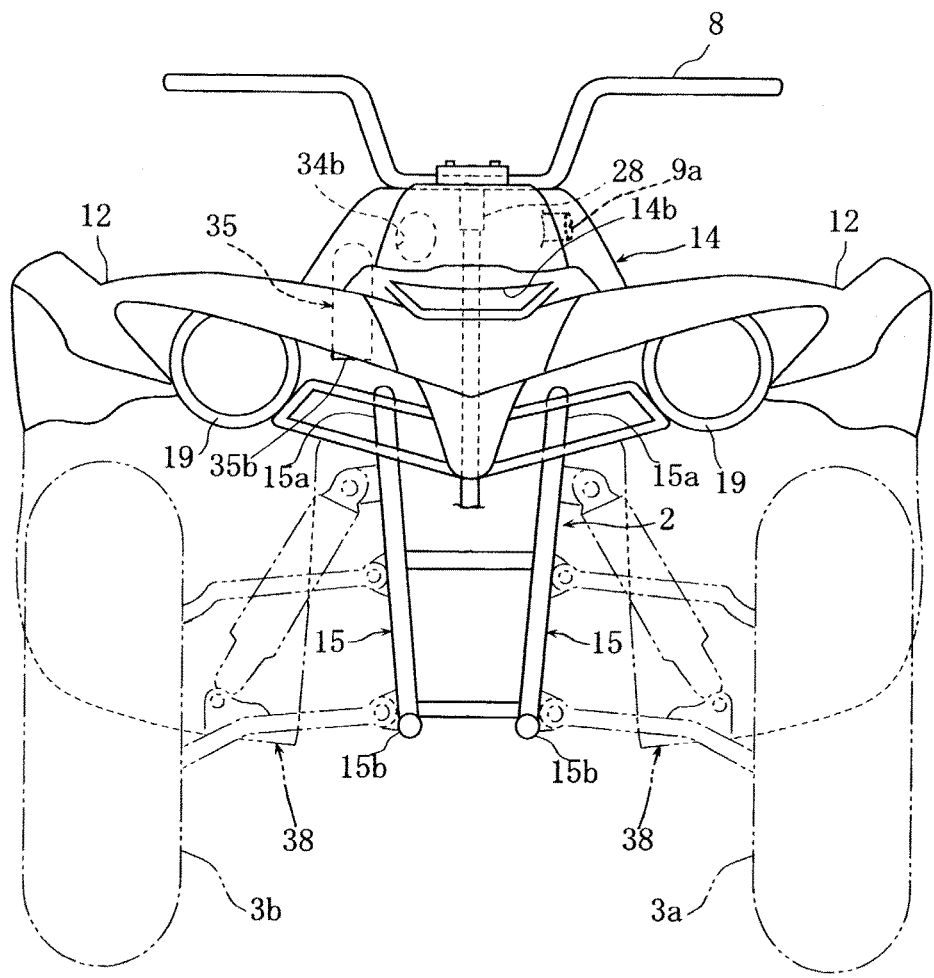
FIG. 1 is a front view of a vehicle according to an embodiment of the present invention.
Figure 2:
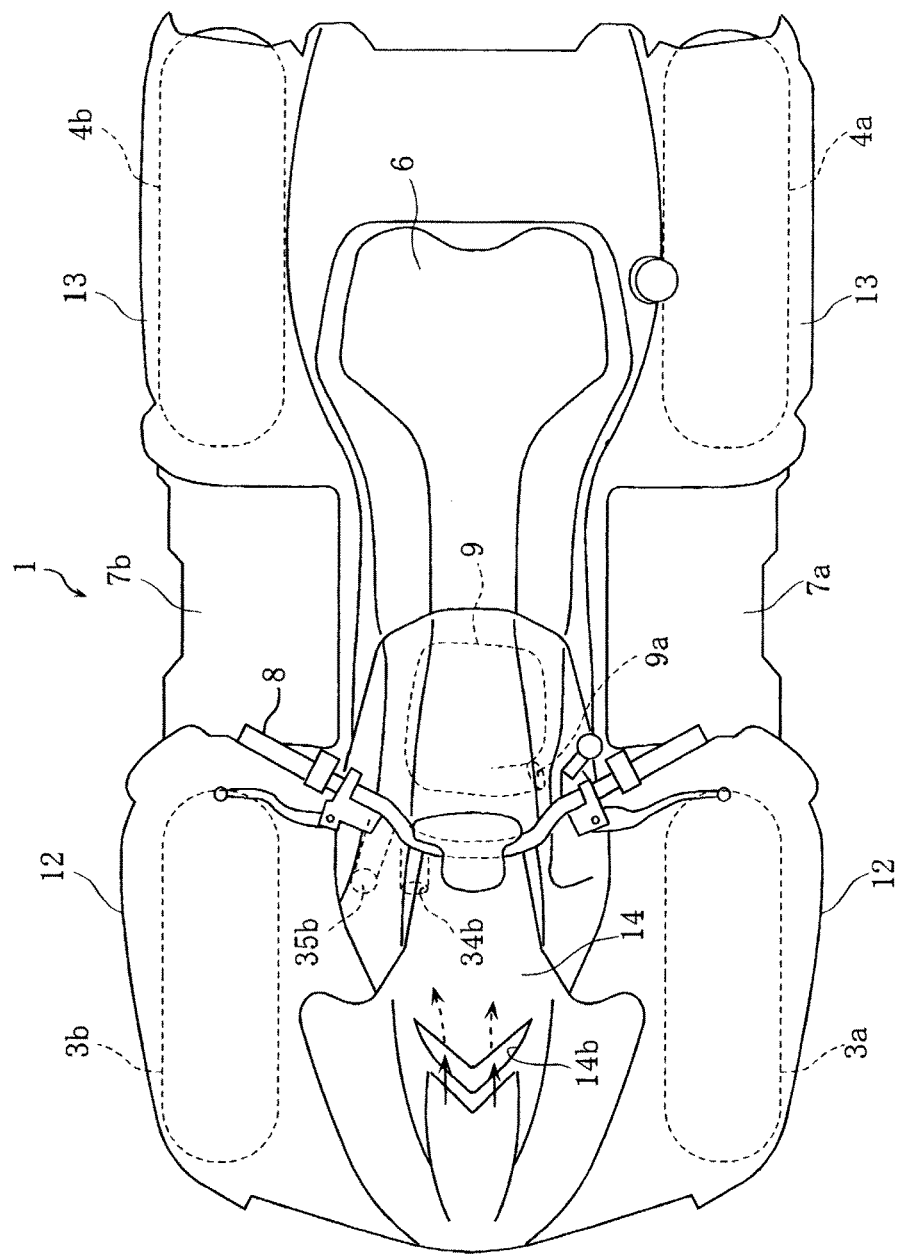
FIG. 2 is a plan view of said vehicle.
Figure 3:
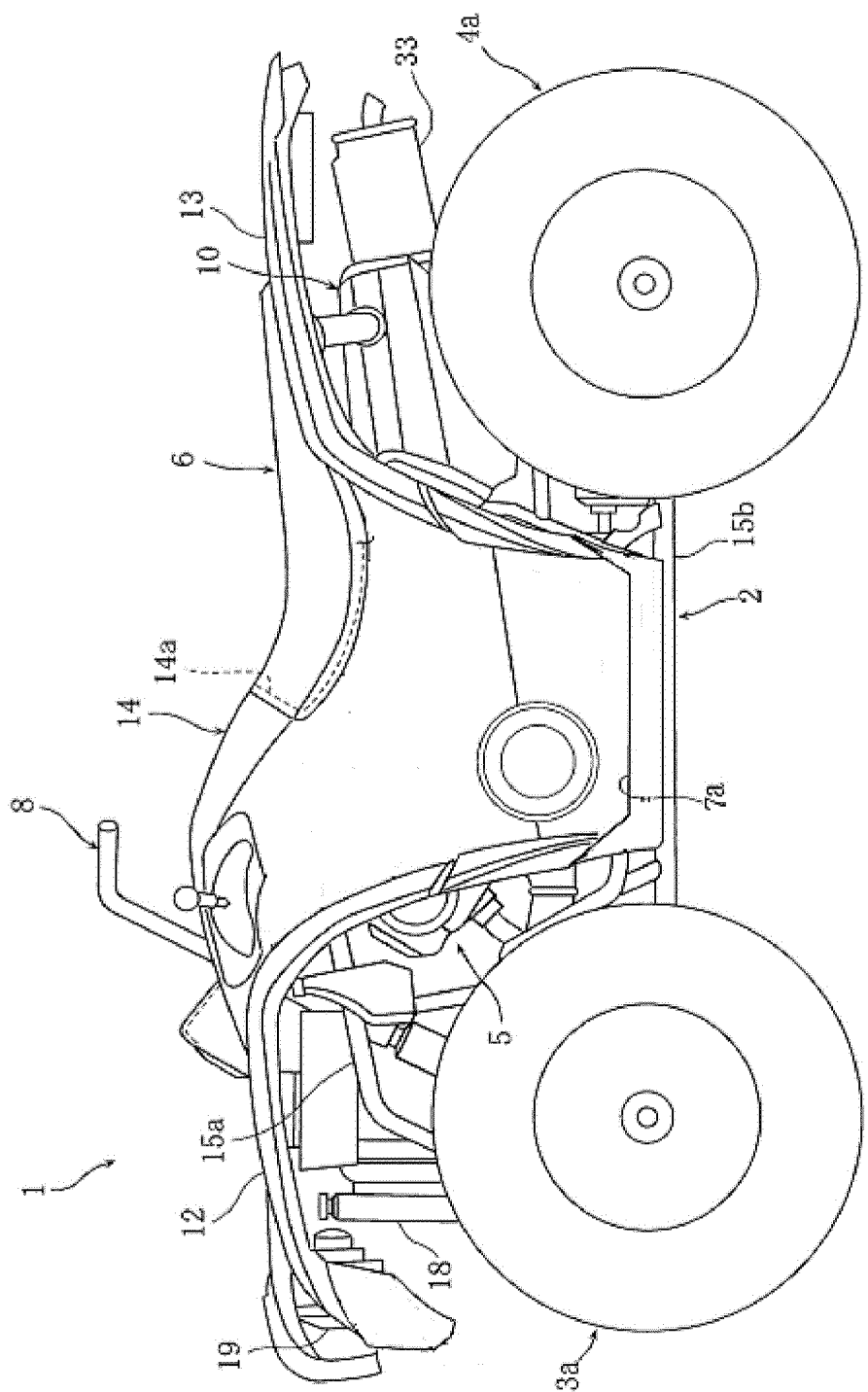
FIG. 3 is a left side view of said vehicle.

Embodiments of the present invention will be described below with reference to the drawings. FIGS. 1 through 13 are drawings illustrating a vehicle according to an embodiment of the present invention. In the present specification, unless indicated otherwise, front, back, left and right signify the front, back, left and right as viewed while sitting on the seat.

In one embodiment, the compact all terrain vehicle 1 includes a vehicle body frame 2, a pair of left and right front wheels 3a, 3b arranged at the front of the vehicle body frame 2 and a pair of left and right rear wheels 4a, 4b arranged at the rear, and a steering shaft 28 which steers the left and right front wheels 3a, 3b and is provided in the middle of the vehicle body frame 2 with respect to the widthwise direction of the vehicle.

The steering shaft 28 is supported on the vehicle body frame 2 so as to be rotatable to the left and right. A handlebar member 8 is connected to the top end part and a power steering unit 47, described below, is connected to the bottom end part of the steering shaft 28 with respect to the vertical direction of the vehicle.

The vehicle 1 includes an engine unit 5 mounted on the vehicle body frame 2 rearward of the steering shaft 28 with respect to the front-back direction of the vehicle, a saddle seat 6 arranged so as to be located above the engine unit 5, and platform style footrests 7a, 7b arranged on the left and right sides of the engine unit 5 with respect to the widthwise direction of the vehicle.

Furthermore, the vehicle 1 includes a fuel tank 10 arranged rearward of the cylinder head 20b of the engine unit 5 in the front-back direction of the vehicle such that a portion of the fuel tank is located in the middle with respect to the widthwise direction of the vehicle; an electric power steering unit 47 which is arranged forward of the cylinder head 20b with respect to the front-back direction of the vehicle such that a portion of the unit is located in the middle with respect to the widthwise direction of the vehicle, and which provides steering power assist to handlebar member 8; and a rear gear unit 31 arranged rearward of the cylinder head 20b with respect to the front-back direction of the vehicle and such that a portion of the unit is located in the middle with respect to the widthwise direction of the vehicle.

In one embodiment, the fact that a portion of the fuel tank 10, etc. is located in the middle with respect to the widthwise direction of the vehicle signifies that, in plan view of the vehicle, a portion of the fuel tank 10, etc. overlaps the centerline C passing through the center with respect to the widthwise direction of the vehicle. Centerline C defines a central plane which extends upward and downwards from said centerline C along the length of centerline C.

The vehicle body frame 2 includes a pair of left and right steel tube frame members 15 extending in the front-back direction of the vehicle and multiple cross members 16 which extend in the widthwise direction of the vehicle and join the left and right frame members 15 to each other.

The left and right frame members 15 are substantially symmetrical. The upper frame 15a which extends in the front-back direction of the vehicle below the seat 6 and the underframe 15b which extends in the front-back direction of the vehicle below the engine unit 5 are connected at the front by a front suspension pipe 15f and front pipe 15c extending in the vertical direction, and are connected in the middle by an intermediate pipe 15d and at the rear end part by a rear pipe 15e. The front end part of the upper frame 15a furthermore curves downward and is connected to the front end part of the underframe 15b.

Furthermore, each frame member 15 includes a front suspension pipe 15f which connects the upper frame 15a and underframe 15b, and a rear suspension pipe 15g which connects the intermediate pipe 15d and rear pipe 15e.

Reinforcing member 15h is connected between the upper frame 15a and the front pipe 15c, and front reinforcing member 15i and rear reinforcing member 15j are connected between the upper frame 15a and intermediate pipe 15d.

Footrest brackets 17 which support the footrests 7 are connected to the middle part, with respect to the front-back direction, of each underframe 15b so as to project outward in the widthwise direction of the vehicle.

A radiator 18 is arranged on the front end part of the vehicle body frame 2, and a pair of left and right headlights 19 is arranged in front of the radiator 18.

An air cleaner 9 is arranged above the engine unit 5 on the vehicle body frame 2, and a battery 40 is arranged further to the rear of the vehicle than the air cleaner 9.

The air cleaner 9 is arranged to the rear of the vehicle from the steering shaft 28 and forward of the seat 6, and is mounted across the left and right upper frames 15a over rubber bushings (not illustrated). The intake port 9a of the air cleaner 9 opens diagonally to the left and rear.

The battery 40 is housed together with electrical components such as relay switches and fuses and a tool kit (not illustrated) in a storage box 41 supported on the vehicle body frame 2.

The battery 40 is arranged so as to be located between the left and right frame members 15 and below the seat 6, and to the front of the fuel tank 10. Furthermore, in plan view of the vehicle, the battery 40 is arranged so as to overlap the engine unit 5 from above and is offset to the left in the widthwise direction of the vehicle in relation to the centerline C.

The left and right front wheels 3a, 3b are supported so as to be vertically slidable on the vehicle body frame 2 by means of front suspensions 38. The left and right rear wheels 4a, 4b are supported so as to be vertically slidable on the vehicle body frame 2 by means of rear suspensions 39. In one embodiment, low pressure wide balloon tires are installed on the front wheels 3a, 3b and rear wheels 4a, 4b.

Figure 5:
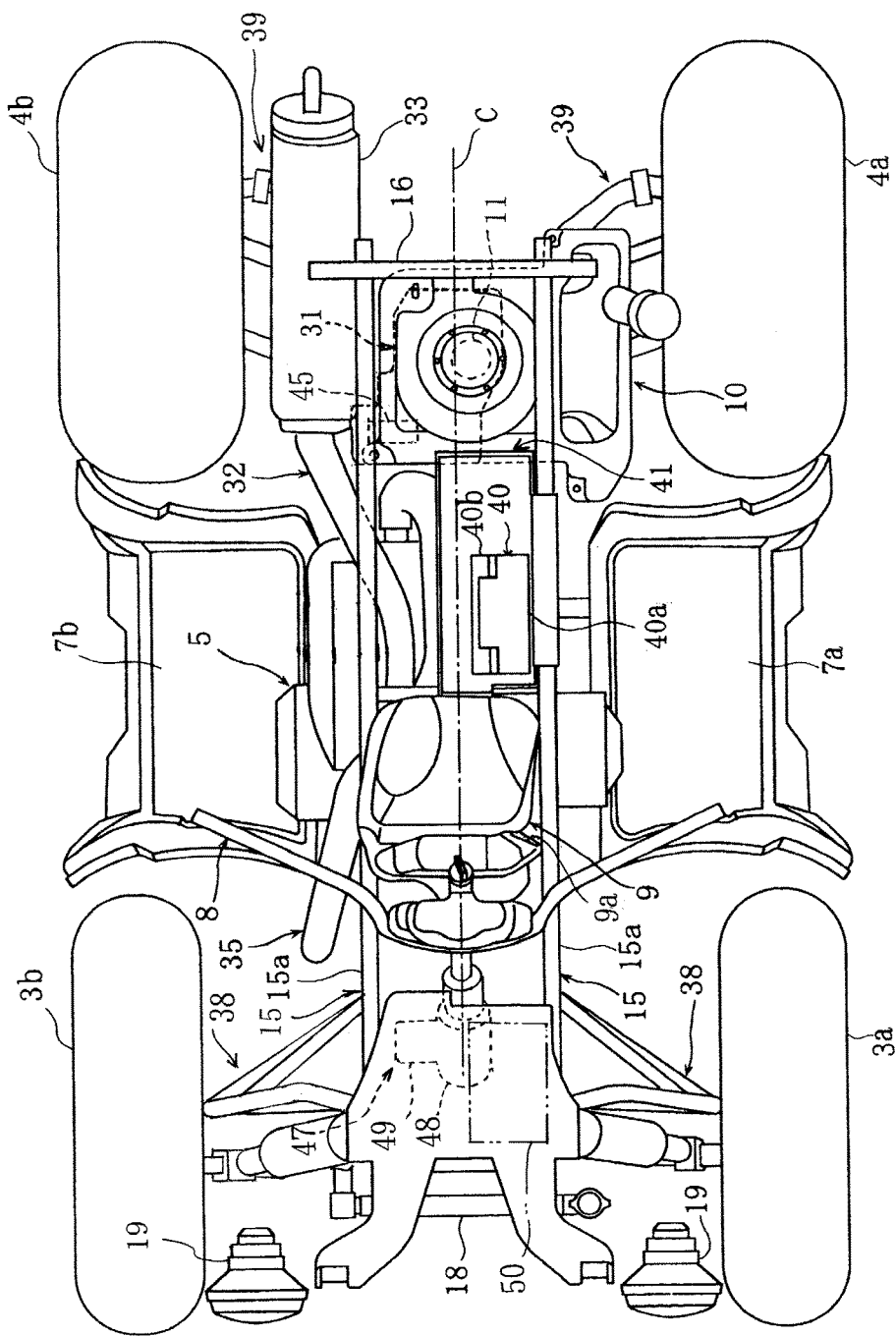
FIG. 5 is a plan view of said vehicle in a state where the vehicle body cover, front and rear fenders and the like have been removed.
Figure 6:
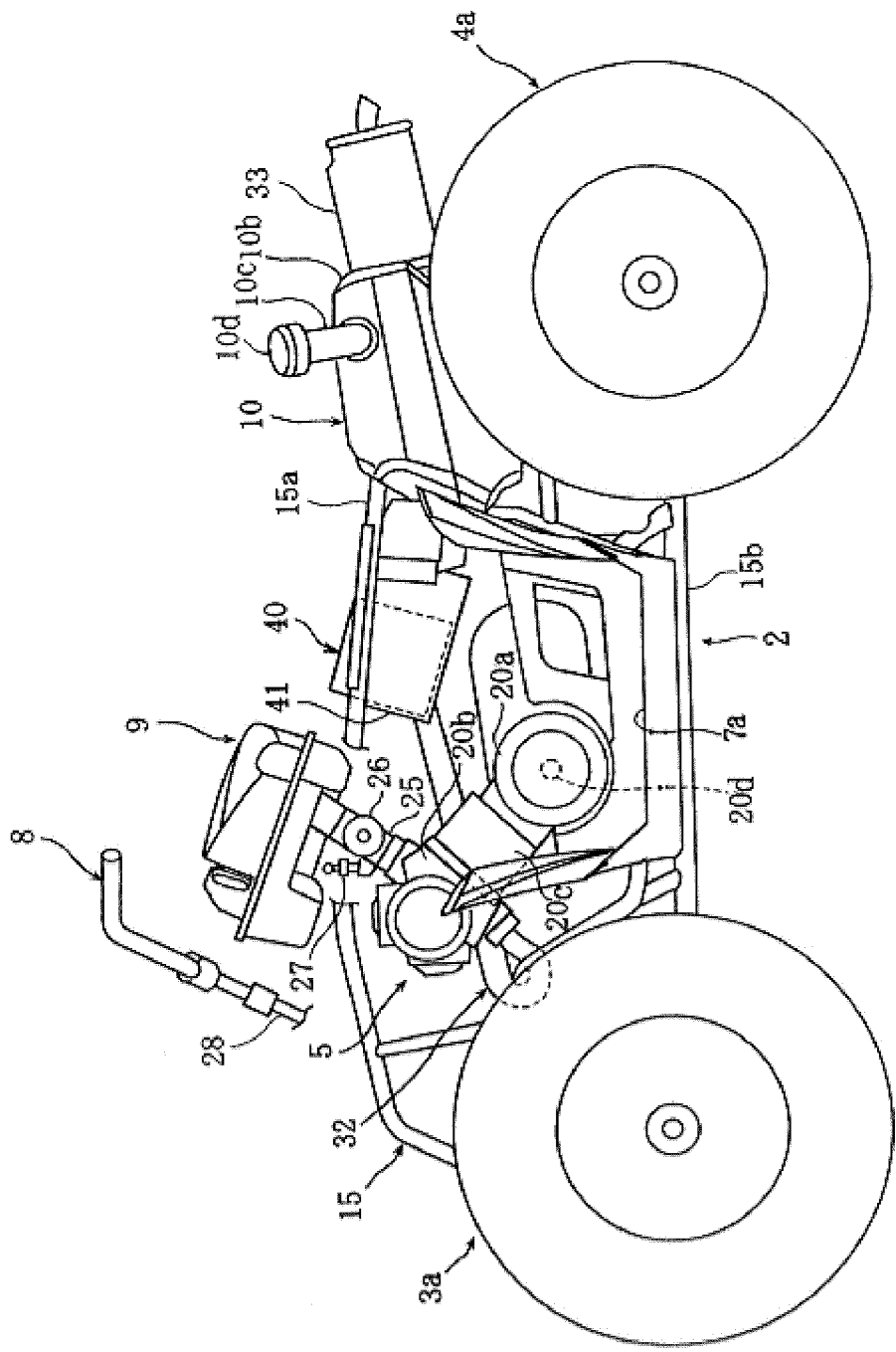
FIG. 6 is a left side view of the engine unit mounted on the vehicle body frame of said vehicle.
Figure 7:
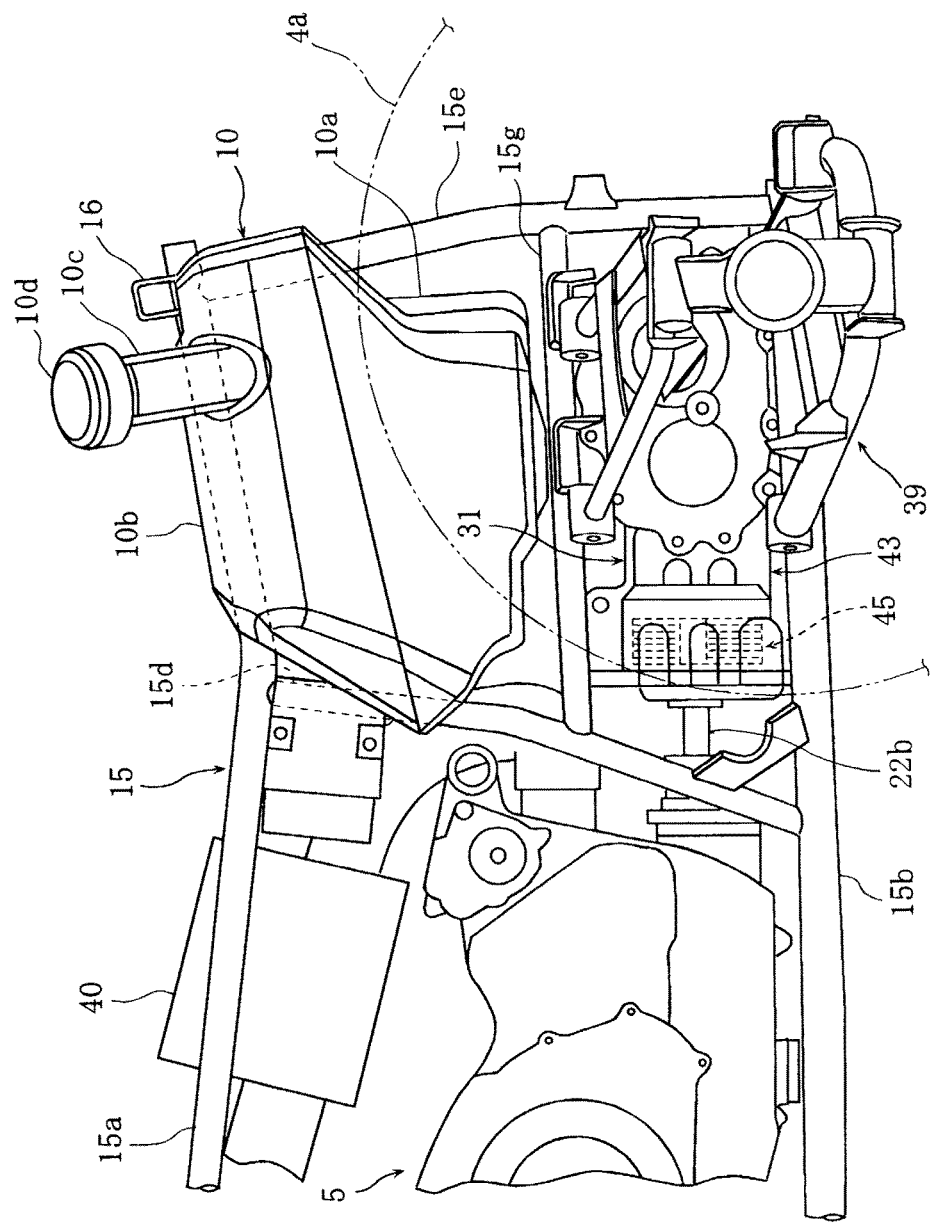
FIG. 7 is a left side view of the fuel tank and rear gear unit provided on said vehicle body frame.

Left and right front fenders 12 which cover the left and right front wheels 3a, 3b from above and left and right rear fenders 13 which cover the left and right rear wheels 4a, 4b from above are attached to the vehicle body frame 2. Note that in FIG. 5, illustration of the left and right front fenders and left and right rear fenders has been omitted.

Furthermore, a vehicle body cover 14 which covers the area below and around the seat 6, as well as covering the space between the left and right front fenders 12 and the air cleaner 9, is attached to the vehicle body frame 2. A service opening 14a, which is opened and closed by the seat 6, is formed in the vehicle body cover 14 below the seat 6 (see FIG. 3).

The engine unit 5 has a structure wherein a water cooled four cycle engine 20 and a V-belt type automatic transmission 21 are integrally connected.

In one embodiment, The engine unit 5 has a structure wherein a water cooled four cycle single cylinder type engine 20 and a V-belt type automatic transmission 21 are integrally connected, and is mounted on the vehicle body frame 2 with the crankshaft 20d being oriented in the widthwise direction of the vehicle and horizontally.

The engine 20 includes a crankcase 20a which houses the crankshaft 20d, and a cylinder body 20c and cylinder head 20b connected to the front part of the top surface of the crankcase 20a so as to extend diagonally forward and upward.

An air intake tube 25 is connected to the rear wall of the cylinder head 20b. The air intake tube 25 is arranged between the left and right frame members 15 so as to extend substantially vertically upward from the cylinder head 20b. A throttle body 26 is installed midway in the air intake tube 25, and the air cleaner 9 is connected to the upstream end of the air intake tube 25 (see FIG. 6).

A fuel injection valve 27 is installed in the throttle body 26. This fuel injection valve 27 injects and supplies high pressure fuel from a fuel pump 11 arranged inside the fuel tank 10 into the combustion chamber of the cylinder head 20b.

An exhaust pipe 32 is connected to the front wall of the cylinder head 20b of the engine 20. This exhaust pipe 32 is arranged so as to extend in the front-back direction of the vehicle in the area between the left and right frame members 15 and to the rear of the cylinder head 20b with respect to the front-back direction of the vehicle. More specifically, the exhaust pipe 32 is brought out from the cylinder head 20b toward the front of the vehicle, then passes along the right side of the cylinder head 20b, and extends toward the rear of the vehicle. A muffler 33 is connected to the downstream end of the exhaust pipe 32. Viewed from above, this muffler 33 is arranged between the right frame member 15 and the right rear wheel 4b.

The automatic transmission 21 is housed in a transmission case 21a connected to the right side wall part of the crankcase 20a with regard to the widthwise direction of the vehicle. The automatic transmission 21 has a structure wherein a drive pulley 23a mounted on the crankshaft 20d and a follower pulley 23c mounted on a follower shaft 23b are coupled by a V-belt 23d.

An air intake duct 24 which admits cooling air into the transmission case 21a and an exhaust duct 35 which exhausts the admitted cooling air are connected to the transmission case 21a.

The air intake duct 34 is arranged so as to extend vertically along the right side of the cylinder head 20b with respect to the widthwise direction of the vehicle. The air intake port 34b formed at the top end part of the air intake duct 34 is arranged between the left and right upper frames 15a and to the right side of the steering shaft 28 with respect to the widthwise direction of the vehicle, and opens toward the front of the vehicle.

The exhaust duct 35 is arranged so as to extend between the left and right frame members 15 and above the engine unit 5 in the front-back direction of the vehicle. The exhaust port 35b formed in the front end part of the exhaust duct 35 is arranged forward of the rear end part of the handlebar member 8, and opens to the bottom of the vehicle.

The vehicle body cover 14 covers the intake port 34b of the air intake duct 34, the exhaust port 35b of the exhaust duct 35, the area above the intake port 9a of the air cleaner 9, and the area around the steering shaft 28. A traveling air stream opening 14b which opens to the front of the vehicle is formed forward of the handlebar member 8 in the vehicle body cover 14 (see FIG. 1 and FIG. 2). A portion of the air stream generated by travel which is taken in through this traveling air stream opening 14b flows into the air intake duct 34 and air cleaner 9.

A front wheel drive shaft 22a extending toward the front of the vehicle and a rear wheel drive shaft 22b extending toward the rear of the vehicle are coupled to the follower shaft 23b of the automatic transmission 21 via a power transmission mechanism 22.

The front wheel drive shaft 22a is coupled to the left and right front wheels 3a, 3b by means of a front gear unit 30 and rotationally drives the front wheels 3a, 3b. Furthermore, the rear wheel drive shaft 22b is connected to the input shaft 52 of the rear gear unit 31 by means of a spline fit or the like and rotationally drives the rear wheels 4a, 4b via the rear gear unit 31.

Moreover, the rear gear unit 31 is arranged between the left and right frame members 15 and below the fuel tank 10. The rear gear unit 31 is furthermore arranged such that the axis D of its input shaft 52 is offset by an amount E to the right with respect to the widthwise direction of the vehicle in relation to the centerline C (see FIG. 9).

The rear gear unit 31 includes an input shaft 52 connected to the rear wheel drive shaft 22b, an intermediate shaft 55 to which the rotation of the input shaft 52 is transmitted via a pair of bevel gears 53, 54, and an output shaft 58 to which the rotation of the intermediate shaft 55 is transmitted via a pair of spur gears 56, 57. The input shaft 52, bevel gears 53, 54, intermediate shaft 55, spur gears 56, 57 and output shaft 58 are housed in gear case 43.

The input shaft 52 is arranged with its axis D oriented in the front-back direction of the vehicle and horizontally, and is rotatably supported on the gear case 43 by means of bearings 60, 61.

The intermediate shaft 55 is arranged rearward of the input shaft 52 with respect to the front-back direction of the vehicle and with its axis G orthogonal to the axis D of the input shaft 52. Furthermore, the intermediate shaft 55 is arranged with its axis G oriented in the widthwise direction of the vehicle and horizontally, and is rotatably supported on gear case 43 by means of bearings 62, 63.

The output shaft 58 is arranged rearward of the intermediate shaft 55 with respect to the front-back direction of the vehicle and parallel to the intermediate shaft 55, and is rotatably supported on gear case 43 by means of bearings 64, 65. Although not illustrated, the output shaft 58 is coupled to left and right rear wheels 4a, 4b by means of left and right universal joints and left and right drive shafts.

A wet brake 45 is provided on the input side part of the input shaft 52. The wet brake 45 includes brake discs 59 consisting of a plurality of stationary discs 59a and rotating discs 59b, and a cam member 70 which presses the discs 59a, 59b into contact in the axial direction, with the bottom part of the brake discs 59 being immersed into lubricating oil that is filled into the gear case 43.

Figure 11:
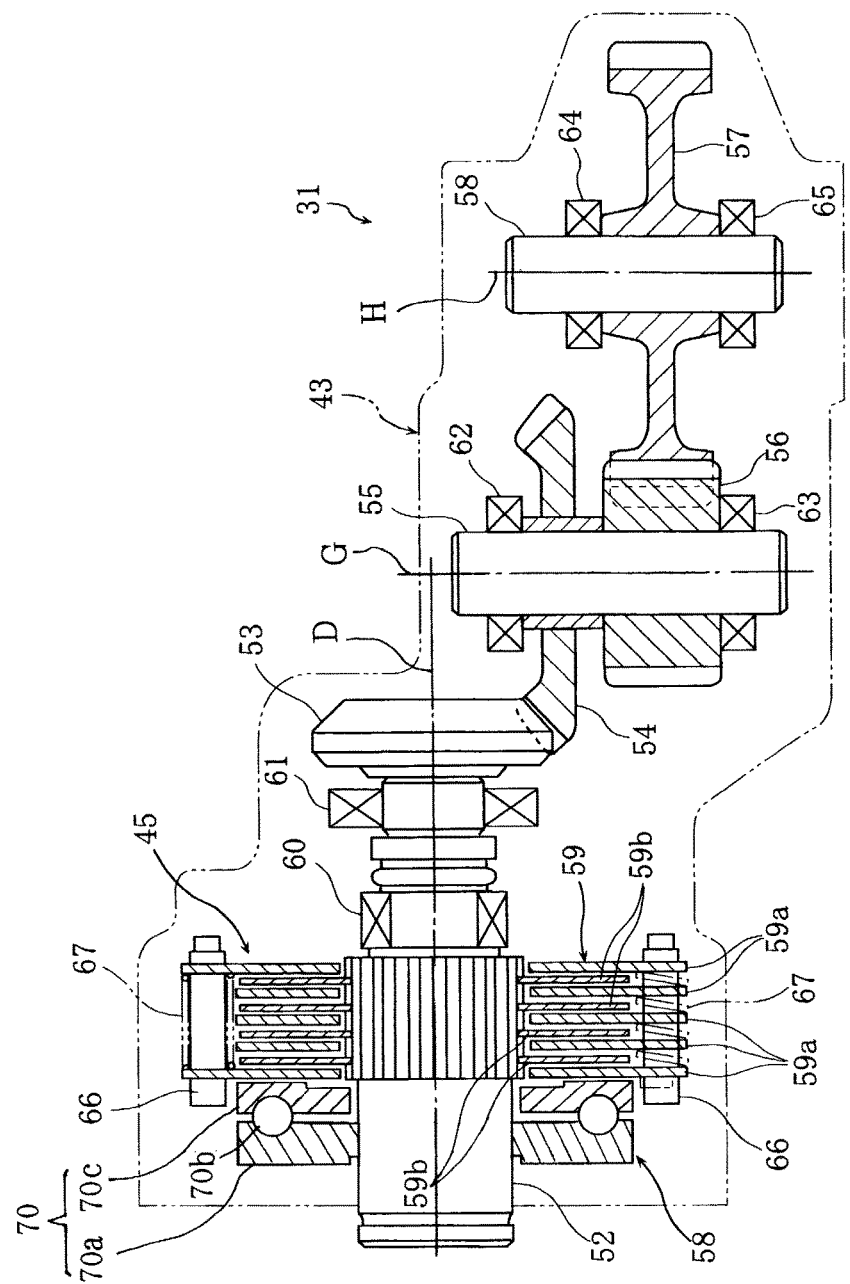
FIG. 11 is a cross-sectional developed view of said rear gear unit.
Figure 12:
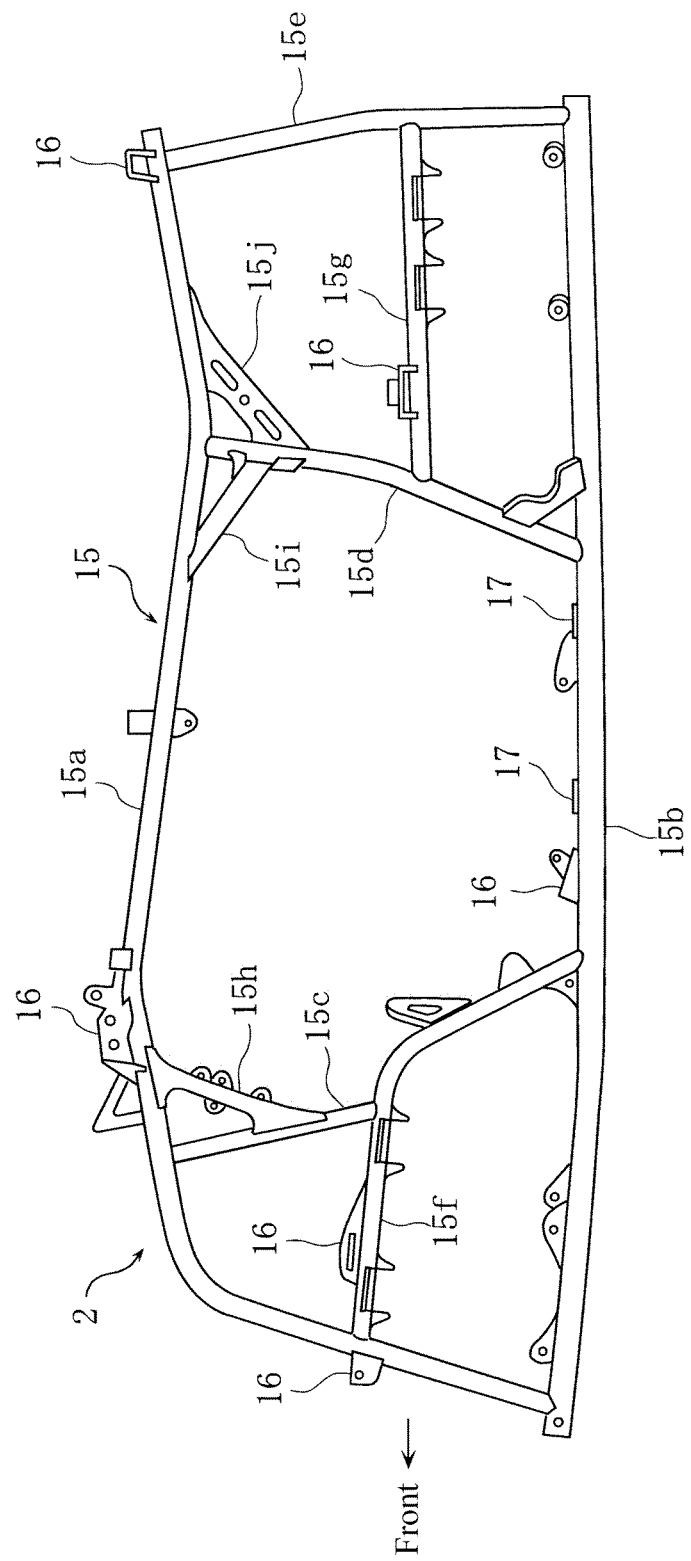
FIG. 12 is a left side view of said vehicle body frame.
Figure 13:
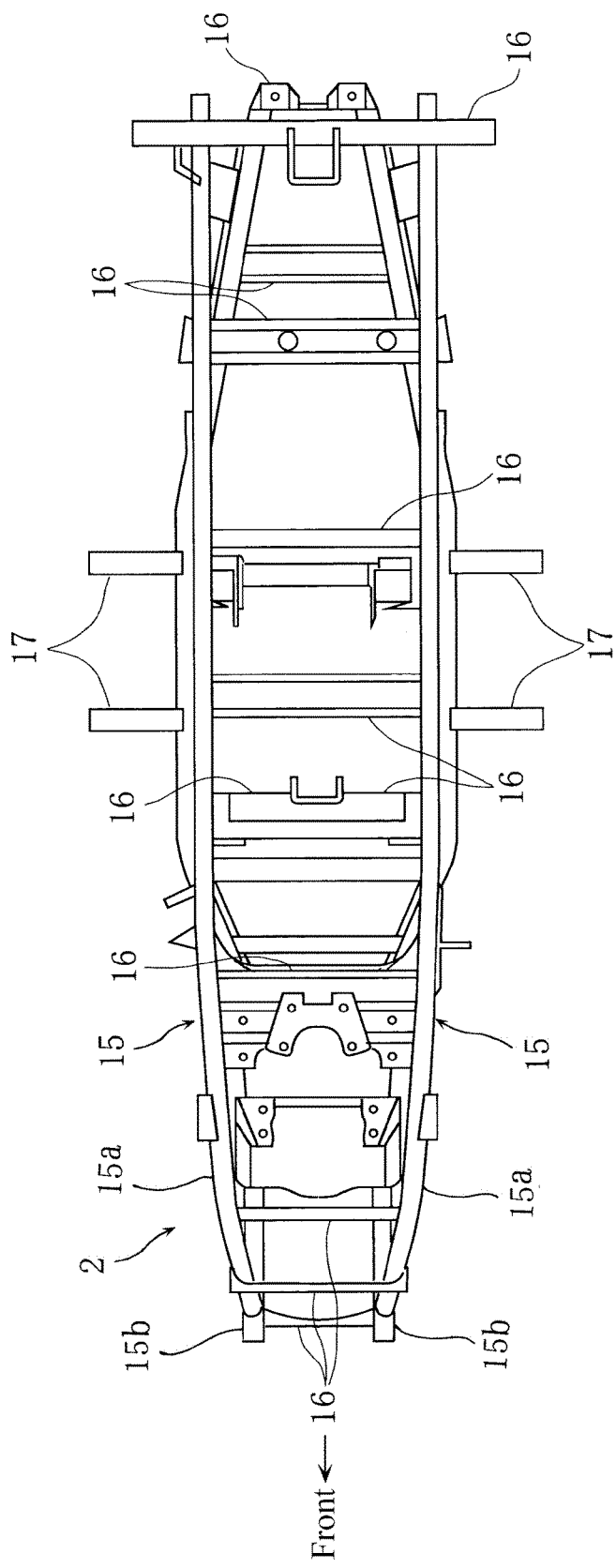
FIG. 13 is a plan view of said vehicle body frame.

The stationary discs 59a, as shown in FIG. 11, are supported so as to be movable in the axial direction and non-rotatable by means of a plurality of pins 66 attached to the gear case 43. Furthermore, coil springs 67 which impel the stationary discs 59a away from each other are mounted on the pins 66. Furthermore, the rotating discs 59b are spline-fitted onto the input shaft 52 so as to be movable in the axial direction and to rotate together with the input shaft 52.

The cam member 70 includes a cam plate 70a rotatably supported on the input shaft 52 and a pressure plate 70c which is arranged so as to face the cam plate 70a with a ball 70b therebetween, and to be movable in the axial direction. When the cam plate 70a is rotationally driven by a plunger, not shown, the cam plate 70a moves the pressure plate 70c in the axial direction, causing the stationary discs 59a and rotating discs 59b to come into contact under pressure, and apply braking to the rear wheels 4a, 4b as a result.

The power steering unit 47 includes a gear box 48 attached to the vehicle body frame 2, and an electric motor 49 secured to the gear box 48. The gear box 48 is arranged so as to be located in the middle with respect to the widthwise direction of the vehicle, i.e. so as to overlap the centerline C in plan view.

Furthermore, a controller 50 which controls the turning assist force generated by the electric motor 49 is installed forward of the steering shaft 28.

Turning assist force is generated by the electric motor 49 according to the steering effort applied to the handlebar member 8, the angle of rotation of the steering shaft 28, the turning speed, etc. This turning assist force is transmitted to the steering shaft 28 through a gear mechanism housed inside the gear box 48. The steering effort involved in steering the handlebar member 8 is thereby reduced.

The fuel tank 10 is arranged so as to be located between the left and right frame members 15 and between the left and right rear wheels 4a, 4b in plan view of the vehicle (see FIG. 5).

The fuel tank 10 includes a tank main body 10a and an extension part 10b formed continuing from the tank main body 10a so as extend to the outside of the left frame member 15 with respect to the widthwise direction of the vehicle. A fuel supply tube 10c is formed extending upward on the extension piece 10b, and a fuel cap 10d is installed on the fuel supply tube 10c.

The fuel tank main body 10a is arranged in a space surrounded by the left and right upper frames 15a, the intermediate pipes 15d, the rear pipes 15e and the rear suspension pipes 15g.

The fuel pump 11 includes a pump main body 11b having a flange part 11a at its top end, and an intake part 11c connected to the pump main body 11b and arranged near the tank bottom.

The pump main body 11b and intake part 11c are housed inside the tank main body 10a, and the flange part 11a is secured to the top wall surface of the tank main body 10a. This flange part 11a overlaps the centerline C (see FIG. 9).

The fuel tank 10 is arranged above the rear gear unit 31 and overlaps the rear gear unit 31 in plan view. Furthermore, the wet brake 45 of the rear gear unit 31 is arranged so as to be located further to the front of the vehicle than the fuel pump 11 (see FIG. 9 and FIG. 8).

Figure 4:
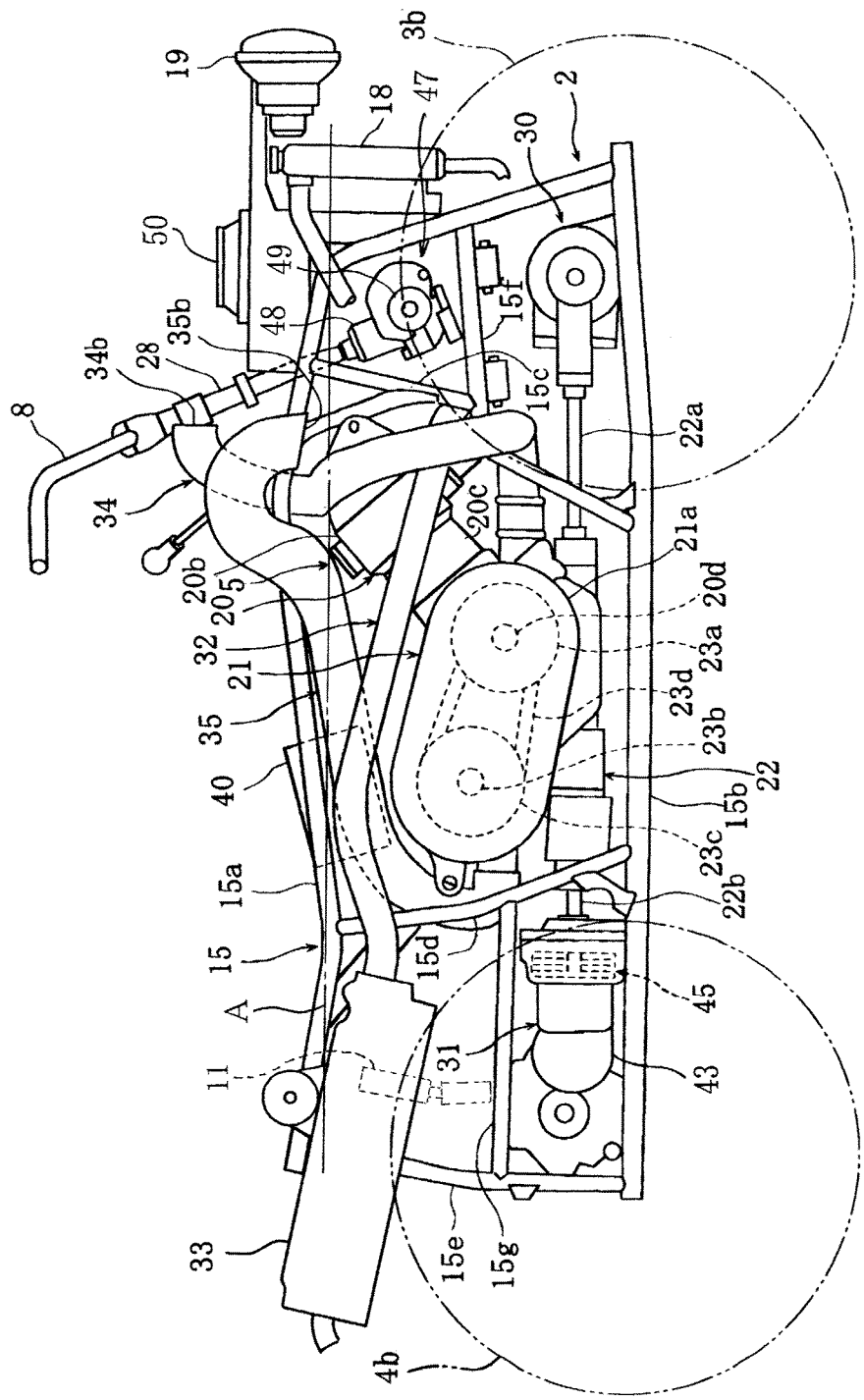
FIG. 4 is a right side view of said vehicle in a state where the vehicle body cover, front and rear fenders and the like have been removed.
Figure 8:
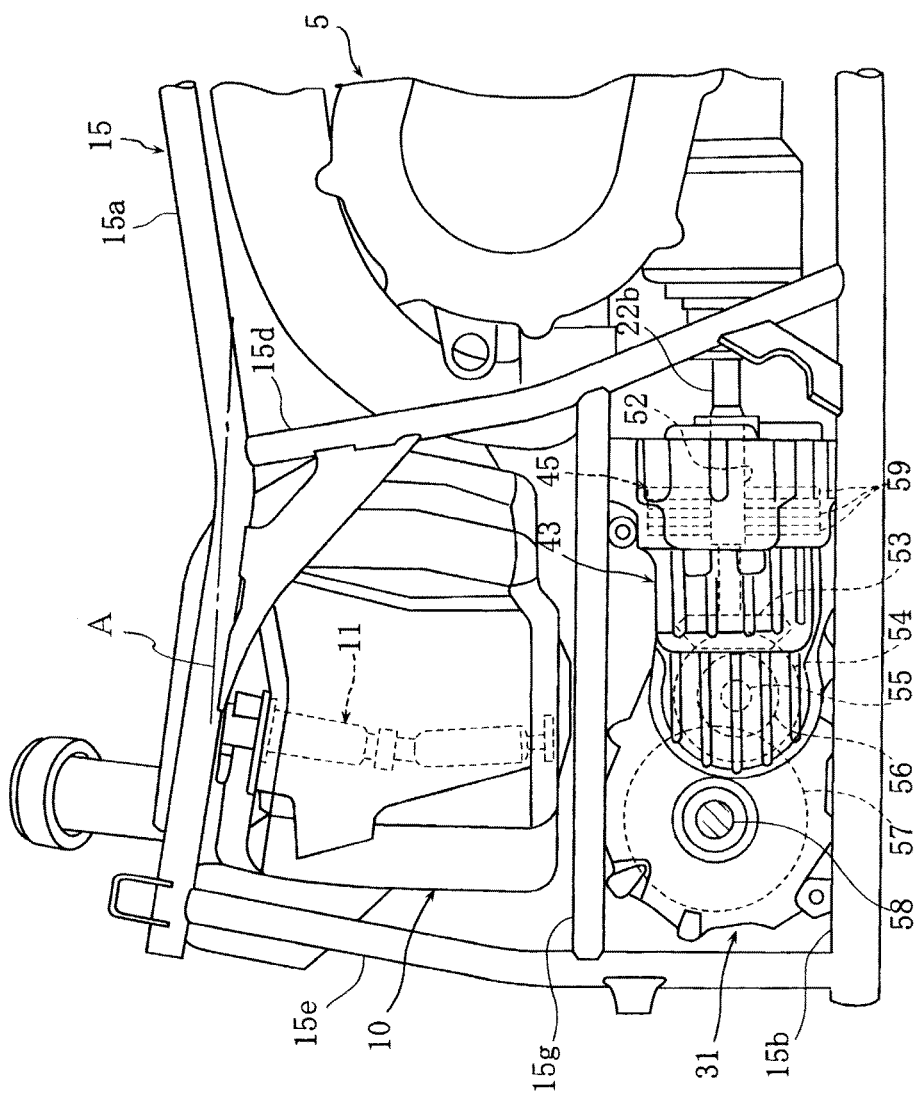
FIG. 8 is a right side view of said fuel tank and rear gear unit.
Figure 9:
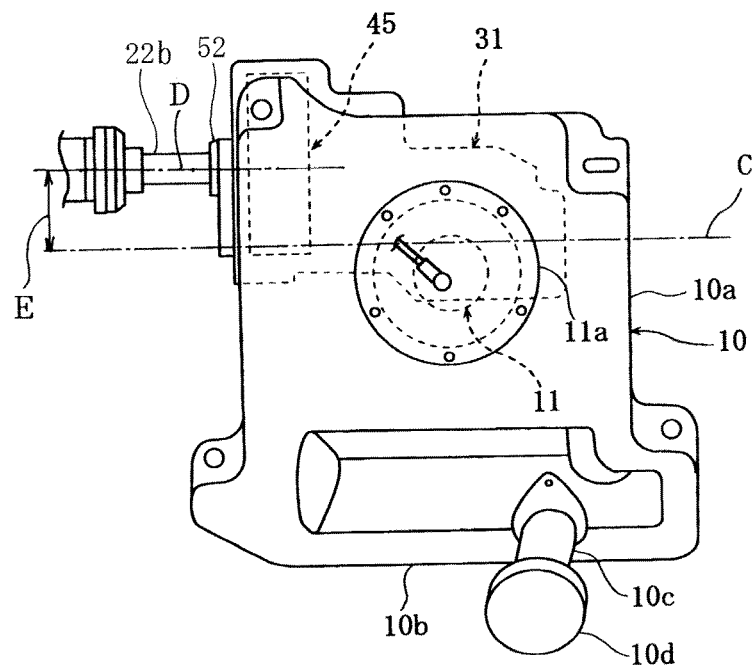
FIG. 9 is a plan view of said fuel tank and rear gear unit.
Figure 10:
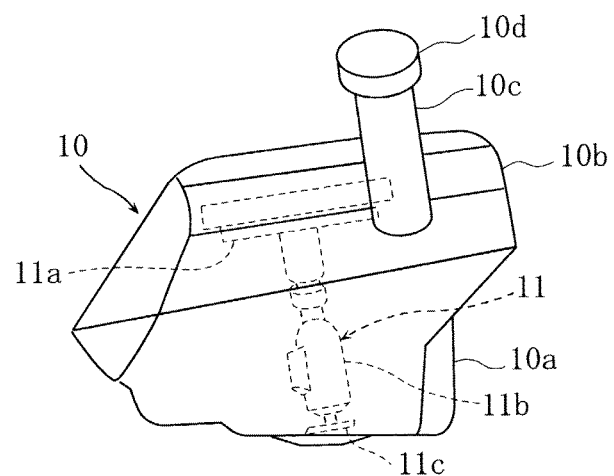
FIG. 10 is a left side view of said fuel tank.

In side view of the vehicle, the fuel pump 11, electric motor 49 and wet brake 45 are arranged parallel to the centerline C and at a position lower than the horizontal line A passing through the top end of the cylinder head 20b (see FIG. 4 and FIG. 8). Furthermore, the fuel pump 11 and the electric motor 49 are arranged substantially at the same height.

Furthermore, in plan view of the vehicle, the fuel pump 11, electric motor 49 and wet brake 45 are arranged so as to be located between the left and right frame members 15 (see FIG. 5).

According to one embodiment, the engine unit 5 is arranged in the middle of the vehicle body frame 2 with respect to the widthwise direction of the vehicle and rearward of the steering shaft 28, and the fuel tank 10 with a built-in fuel pump 11 and the rear gear unit 31 including a wet brake 45 are arranged rearward of the cylinder head 20b of the engine unit 5 and such that at least a portion of the fuel tank 10 and of the rear gear unit 31 is located in the middle with respect to the widthwise direction of the vehicle, and the power steering unit 47 including an electric motor 49 is arranged forward of the cylinder head 20b and such that at least a portion of the unit is located in the middle with respect to the widthwise direction of the vehicle.

In this way, by employing a combination of the three components of fuel tank 10 with a built-in fuel pump 11, rear gear unit 31 comprising a wet brake 45 and power steering unit 47 including an electric motor 49, lined up in the front-back direction of the vehicle and such that at least a portion of the three components is located in the middle with respect to the widthwise direction of the vehicle, it becomes possible to avoid an increase in the widthwise dimension of the vehicle body while installing electrically driven accessories, allowing the body to be made more compact.

If the fuel pump were to be arranged outside the fuel tank and the brake system were to be arranged outside the rear gear unit, the necessary layout space would increase accordingly and would pose a problem with regard to making the body compact.

Furthermore, the fuel pump 11, electric motor 49 and wet brake 45 are arranged between the left and right frame members 15 in plan view of the vehicle, and this point also makes it possible to avoid an increase in the widthwise direction of the vehicle body while installing accessories such as the fuel pump 11 and electric motor 49, allowing the body to be made more compact.

Furthermore, since the fuel pump 11, electric motor 49 and wet brake 45 are arranged at a position lower than the horizontal line A passing through the top end of the cylinder head 20b, the height of the body can be reduced while installing accessories such as a fuel pump 11 and electric motor 49, and this point also allows the body to be made more compact.

Moreover, the fuel pump 11 and electric motor 49 are arranged substantially at the same height, and this point also makes it possible to reduce the height of the body, allowing the body to be made more compact.

In one embodiment, in plan view of the vehicle, the fuel tank 10 is arranged so as to overlap the rear gear unit 31, so the fuel tank 10 can be arranged using the empty space above the rear gear unit 31, allowing the body to be made more compact. Here, the large diameter wet brake 45 within the rear gear unit 31 is arranged forward of the large height dimension fuel pump 11 inside the fuel tank 10, so that the two do not overlap, making it possible to avoid an increase in the vertical dimension while arranging the fuel tank 10 and rear gear unit 31 in overlapping fashion.

The invention claimed is:

1. A vehicle comprising:
a vehicle body frame having a length and width and a central plane extending from an associated center axis extending along the length of said vehicle body frame;
a pair of left and right front wheels supported on a front part of said vehicle body frame and a pair of left and right rear wheels supported on said vehicle body frame by a rear suspension;
a steering shaft for steering said pair of front wheels;
an engine unit carried by said vehicle body frame rearward of said steering shaft and including a crankcase, a cylinder body and a cylinder head extending from said crankcase, and a transmission case which is provided to a side of said crankcase with respect to a widthwise direction of the vehicle and houses a transmission;
a seat supported on said vehicle body frame so as to be located above said engine unit;
footrests supported on said vehicle body frame so as to be located to sides of said engine unit with respect to the widthwise direction of the vehicle;
a fuel tank which includes a fuel pump at least a portion of which is housed inside the fuel tank, said fuel tank being supported on said vehicle body frame rearwardly of said cylinder head with respect to a front-back direction of the vehicle and with at least a portion of the fuel tank intersecting said central plane; and
a rear gear unit including a wet brake supported on said vehicle body frame so as to be located rearward of said cylinder head with respect to the front-back direction of the vehicle and with at least a portion of the rear gear unit intersecting said central plane, the wet brake being housed in a gear case; wherein
at least a portion of said fuel tank overlaps said rear gear unit in a plan view of the vehicle;
a majority of said fuel pump is located to one side of said central plane and a majority of said wet brake is located to the other side of said central plane; and
said wet brake of said rear gear unit is arranged forward of a forward-most portion of the rear suspension and forward of the fuel pump of said fuel tank with respect to the front-back direction of the vehicle.

2. The vehicle according to claim 1, wherein at least a portion of said fuel pump and at least a portion of said wet brake are arranged lower than a top end of said cylinder head.

3. The vehicle according to claim 2, wherein said vehicle body frame includes left and right frame members which extend in the front-back direction of the vehicle at least above said cylinder head, and at least a portion of said fuel pump and at least a portion of said wet brake are arranged between said left and right frame members in the plan view of the vehicle.

4. The vehicle according to claim 3, wherein said rear gear unit is arranged between the left and right frame members and below said fuel tank.

5. The vehicle according to claim 1, wherein said rear gear unit includes an input shaft connected to a rear wheel drive shaft, an intermediate shaft to which a rotation of said input shaft is transmitted via a pair of bevel gears, and an output shaft to which a rotation of said intermediate shaft is transmitted.

6. The vehicle according to claim 5, wherein said input shaft, said pair of bevel gears, said intermediate shaft, and said output shaft are housed in the gear case.

7. The vehicle according to claim 1, wherein at least a portion of said fuel pump intersects said central plane.

8. The vehicle according to claim 1, wherein at least a portion of said wet brake intersects said central plane.

9. The vehicle according to claim 1, wherein at least a portion of said fuel tank is located rearward of said engine unit.

10. The vehicle according to claim 1, wherein at least a portion of said rear gear unit is located rearward of said engine unit.

* * * * *